United States Patent
Tanaka et al.

(10) Patent No.: US 10,365,454 B2
(45) Date of Patent: Jul. 30, 2019

(54) ZOOM LENS AND IMAGING APPARATUS

(71) Applicant: FUJIFILM Corporation, Tokyo (JP)

(72) Inventors: Takuya Tanaka, Saitama (JP); Shinkichi Ikeda, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/879,460

(22) Filed: Jan. 25, 2018

(65) Prior Publication Data
US 2018/0217359 A1  Aug. 2, 2018

(30) Foreign Application Priority Data

Jan. 27, 2017  (JP) ................. 2017-012818

(51) Int. Cl.
| | |
|---|---|
| *G02B 9/60* | (2006.01) |
| *G02B 13/02* | (2006.01) |
| *G02B 15/14* | (2006.01) |
| *G02B 15/173* | (2006.01) |

(52) U.S. Cl.
CPC .............. *G02B 9/60* (2013.01); *G02B 13/02* (2013.01); *G02B 15/14* (2013.01); *G02B 15/173* (2013.01)

(58) Field of Classification Search
CPC ........ G02B 9/34–58; G02B 9/60; G02B 9/62; G02B 13/04
USPC ........ 359/682, 686–688, 746–747, 752, 753, 359/756–783
See application file for complete search history.

(56) References Cited

U.S. PATENT DOCUMENTS

| | | | | |
|---|---|---|---|---|
| 4,223,981 A * | 9/1980 | Mizutani | ............. | G02B 15/173 359/683 |
| 4,468,097 A * | 8/1984 | Hamanishi | ........... | G02B 15/173 359/687 |
| 4,641,928 A * | 2/1987 | Hamanishi | ........... | G02B 15/173 359/687 |
| 5,309,284 A * | 5/1994 | Nakatsuji | ............. | G02B 15/173 359/687 |
| 7,218,457 B2 * | 5/2007 | Sensui | ................. | G02B 27/646 348/208.11 |
| 7,986,458 B2 * | 7/2011 | Toyoda | ................. | G02B 15/173 359/557 |

(Continued)

FOREIGN PATENT DOCUMENTS

JP  H09-243916 A  9/1997

*Primary Examiner* — Nicholas R. Pasko
(74) *Attorney, Agent, or Firm* — Studebaker & Brackett PC (57) ABSTRACT

The zoom lens consists of, in order from an object side: a first lens group that remains stationary during zooming and has a positive refractive power; at least two movable lens groups that are moved during zooming; and a final lens group that remains stationary during zooming and has a positive refractive power. The final lens group consists of, in order from the object side, a front group and a rear group. The front group has, successively in order from a position closest to the object side, two or less positive lenses and one first front group negative lens, and a second front group negative lens that is different from the first front group negative lens at a position closest to an image side and is concave toward the image side. An aperture stop is provided between the movable lens group and the first front group negative lens. The rear group consists of a positive lens and a rear group negative meniscus lens that is convex toward the image side. In addition, the zoom lens satisfies predetermined conditional expressions.

19 Claims, 9 Drawing Sheets

(56) References Cited

U.S. PATENT DOCUMENTS

8,228,612 B2 * 7/2012 Toyoda ................ G02B 15/173
359/557
8,520,317 B2 * 8/2013 Toyoda ................ G02B 15/173
348/340

* cited by examiner

FIG. 1

EXAMPLE 1

FIG. 2

EXAMPLE 2

WIDE-ANGLE END

TELEPHOTO END

FIG. 3

EXAMPLE 3

WIDE-ANGLE END

TELEPHOTO END

FIG. 4

EXAMPLE 4

WIDE-ANGLE END

TELEPHOTO END

ZOOM LENS AND IMAGING APPARATUS

CROSS REFERENCE TO RELATED APPLICATIONS

The present application claims priority under 35 U.S.C. § 119 to Japanese Patent Application No. 2017-012818 filed on Jan. 27, 2017. The above application is hereby expressly incorporated by reference, in its entirety, into the present application.

BACKGROUND OF THE INVENTION

1. Field of the Invention

The present invention relates to a zoom lens suitable for electronic cameras such as movie imaging cameras, broadcast cameras, digital cameras, video cameras, and surveillance cameras, and to an imaging apparatus comprising the zoom lens.

2. Description of the Related Art

As a zoom lens used in electronic cameras such as movie imaging cameras, broadcast cameras, digital cameras, video cameras, and surveillance cameras, a zoom lens disclosed in JP1997-243916A (JP-H09-243916A) has been proposed.

SUMMARY OF THE INVENTION

In imaging apparatuses such as movie imaging cameras and broadcast cameras, there is a demand for a zoom lens that is compact and lightweight but has favorable optical performance. In particular, reduction in size and weight are strongly demanded for imaging modes focusing on maneuverability and operability.

However, in a case where reduction in size and weight is achieved, spherical aberration and field curvature become large, and thus it is difficult to achieve sufficient optical performance. In the lens system described in JP1997-243916A (JP-H09-243916A), the spherical aberration is not sufficiently small with respect to the level demanded in recent years.

The present invention has been made in consideration of the above-mentioned situations, it is an object of the present invention to provide a zoom lens for which reduction in size and weight is achieved and high optical performance is achieved, and an imaging apparatus comprising the zoom lens.

A zoom lens of the present invention consists of, in order from an object side: a first lens group that remains stationary with respect to an image plane during zooming and has a positive refractive power; at least two movable lens groups that are moved by changing distances between the movable lens groups and adjacent groups in a direction of an optical axis during zooming; and a final lens group that remains stationary with respect to the image plane during zooming and has a positive refractive power. The final lens group consists of, in order from the object side, a front group and a rear group separated by an air distance from the front group. The front group has, successively in order from a position closest to the object side, two or less positive lenses and one first front group negative lens, and a second front group negative lens that is different from the first front group negative lens at a position closest to an image side and is concave toward the image side. A stop is provided between the movable lens group and the first front group negative lens. The rear group consists of a positive lens and a rear group negative meniscus lens that is convex toward the image side. In addition, assuming that a distance on an optical axis from an image side surface of the first front group negative lens to an image side surface of the second front group negative lens is D1n and a distance on the optical axis from a surface closest to the object side to a surface closest to the image side in the front group is D1, Conditional Expression (1) is satisfied.

$$0.1 < D1n/D1 < 1 \quad (1)$$

In addition, it is preferable that at least one of Conditional Expression (1-1) or (1-2) is satisfied.

$$0.3 < D1n/D1 < 0.8 \quad (1\text{-}1)$$

$$0.5 < D1n/D1 < 0.7 \quad (1\text{-}2)$$

In the zoom lens of the present invention, it is preferable that assuming that a focal length of the second front group negative lens is fL1n2 and a focal length of the rear group negative meniscus lens is fL2n, Conditional Expression (2) is satisfied.

$$0.1 < fL1n2/fL2n < 1 \quad (2)$$

It is preferable that at least one of Conditional Expression (2-1) or (2-2) is satisfied.

$$0.1 < fL1n2/fL2n < 0.5 \quad (2\text{-}1)$$

$$0.1 < fL1n2/fL2n < 0.3 \quad (2\text{-}2)$$

It is preferable that assuming that a focal length of the final lens group is fR and a focal length of the front group is fR1, Conditional Expression (3) is satisfied.

$$0.1 < fR/fR1 < 2 \quad (3)$$

It is preferable that Conditional Expression (3-1) is satisfied.

$$0.2 < fR/fR1 < 1.5 \quad (3\text{-}1)$$

It is preferable that assuming that a radius of curvature of an image side surface of the rear group negative meniscus lens is r2n2 and a radius of curvature of an object side surface of the rear group negative meniscus lens is r2n1, Conditional Expression (4) is satisfied.

$$0.1 < (r2n2 - r2n1)/(r2n2 + r2n1) < 1 \quad (4)$$

It is preferable that at least one of Conditional Expression (4-1) or (4-2) is satisfied.

$$0.1 < (r2n2 - r2n1)/(r2n2 + r2n1) < 0.5 \quad (4\text{-}1)$$

$$0.1 < (r2n2 - r2n1)/(r2n2 + r2n1) < 0.4 \quad (4\text{-}2)$$

The rear group may consist of, in order from the object side, a positive lens and the rear group negative meniscus lens. Alternatively, the rear group may consist of, in order from the object side, the rear group negative meniscus lens and a positive lens.

The front group may consist of, in order from the object side, a positive lens, a positive lens, the first front group negative lens, a positive lens, a positive lens, and the second front group negative lens. Alternatively, the front group may consist of, in order from the object side, a positive lens, the first front group negative lens, a positive lens, a positive lens, and the second front group negative lens.

The at least two movable lens groups may consist of two movable lens groups. In this case, it is preferable that the at least two movable lens groups consist of, in order from the object side, a second lens group that has a negative refractive power and a third lens group that has a positive refractive power.

The at least two movable lens groups may consist of three movable lens groups. In this case, it is preferable that the at least two movable lens groups consist of, in order from the object side, a second lens group that has a positive refractive power, a third lens group that has a negative refractive power, and a fourth lens group that has a negative refractive power.

An imaging apparatus of the present invention comprises the above-mentioned zoom lens of the present invention.

It should be noted that the term "consists of ~" means that the imaging lens may include not only the above-mentioned elements but also lenses substantially having no powers, optical elements, which are not lenses, such as a stop, a mask, a cover glass, and a filter, and mechanism parts such as a lens flange, a lens barrel, an imaging element, and a hand shaking correction mechanism.

Further, surface shapes, signs of refractive powers, radii of curvature of the lenses are assumed as those in paraxial regions in a case where some lenses have aspheric surfaces.

According to the present invention, the zoom lens consists of, in order from the object side: the first lens group that remains stationary with respect to the image plane during zooming and has a positive refractive power; the at least two movable lens groups that are moved by changing distances between the movable lens groups and adjacent groups in a direction of an optical axis during zooming; and the final lens group that remains stationary with respect to the image plane during zooming and has a positive refractive power. The final lens group consists of, in order from the object side, the front group and the rear group separated by the air distance from the front group. The front group has, successively in order from at the position closest to the object side, two or less positive lenses and one first front group negative lens, and a second front group negative lens that is different from the first front group negative lens at a position closest to the image side and is concave toward the image side. The stop is provided between the movable lens group and the first front group negative lens. The rear group consists of a positive lens and a rear group negative meniscus lens that is convex toward the image side. In addition, assuming that the distance on the optical axis from the image side surface of the first front group negative lens to the image side surface of the second front group negative lens is D1n and the distance on the optical axis from the surface closest to the object side to the surface closest to the image side in the front group is D1, Conditional Expression (1) is satisfied. Therefore, it is possible to provide a zoom lens for which reduction in size and weight is achieved and high optical performance is achieved, and an imaging apparatus comprising the zoom lens.

$$0.1 < D1n/D1 < 1 \quad (1)$$

DESCRIPTION OF THE PREFERRED EMBODIMENTS

Figure 1:
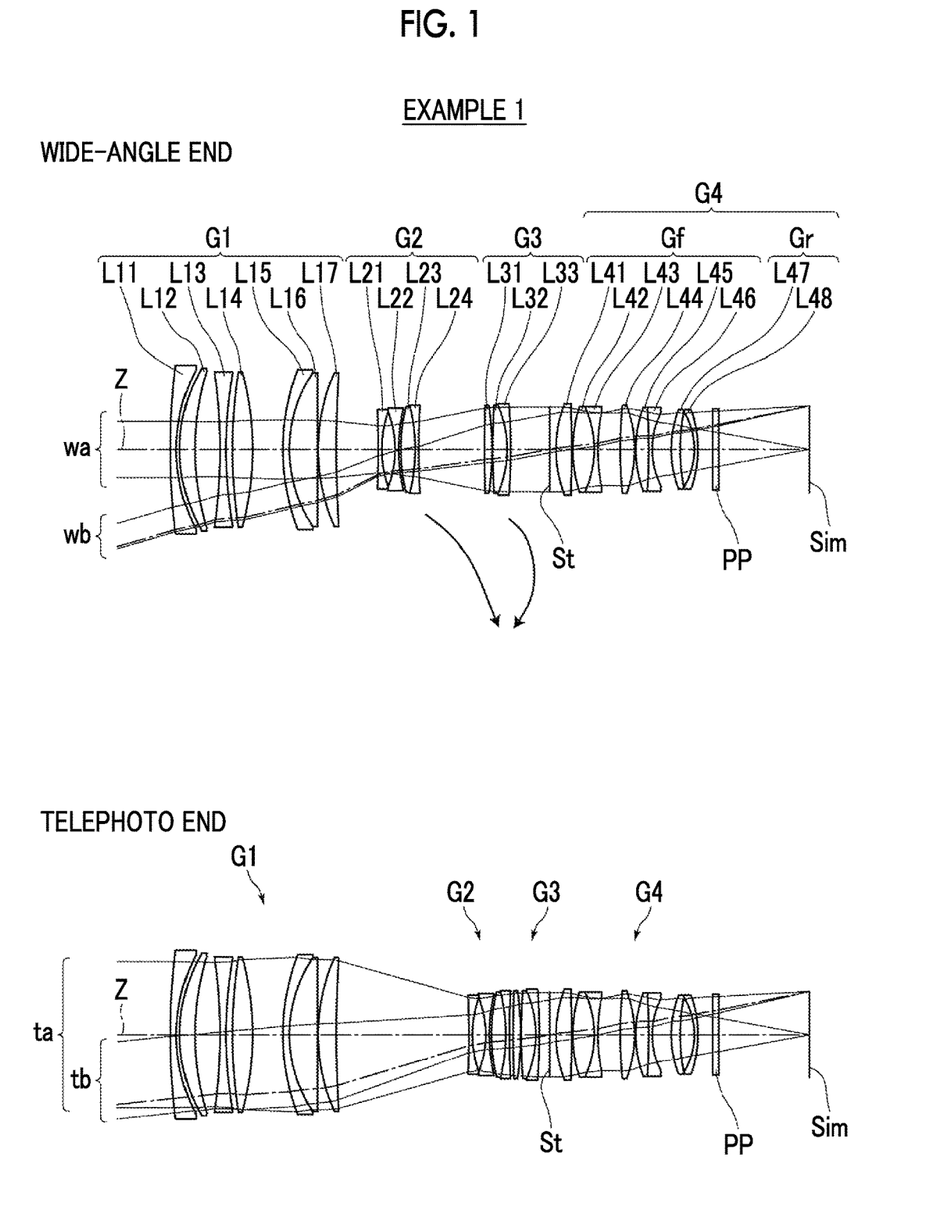
FIG. 1 is a cross-sectional view illustrating a lens configuration of a zoom lens (common to Example 1) according to an embodiment of the present invention.

Hereinafter, embodiments of the present invention will be described with reference to drawings. FIG. 1 is a cross-sectional view illustrating a lens configuration and an optical path of a zoom lens according to an embodiment of the present invention. In FIG. 1, aberrations in the wide-angle end state are shown in the upper part, on-axis rays wa and rays with the maximum angle of view wb are shown as rays. In addition, aberrations in the telephoto end state are shown in the lower part, and on-axis rays to and rays with the maximum angle of view tb are shown as rays. Further, loci of movement of the movable lens groups are indicated by arrows. It should be noted that the example shown in FIG. 1 corresponds to the zoom lens of Example 1 to be described later. FIG. 1 shows a state where the object at infinity is in focus, where the left side of the drawing is the object side and the right side of the drawing is the image side. It should be noted that the aperture stop St shown in the drawing does not necessarily indicate its size and shape, and indicates a position of the stop on the optical axis Z.

In order to mount the zoom lens on an imaging apparatus, it is preferable to provide various filters and/or a protective cover glass based on specification of the imaging apparatus. Thus, FIG. 1 shows an example where a plane-parallel-plate-like optical member PP, in which those are considered, is disposed between the lens system and the image plane Sim. However, a position of the optical member PP is not limited to that shown in FIG. 1, and it is also possible to adopt a configuration in which the optical member PP is omitted.

The zoom lens of the present embodiment consists of, in order from an object side: a first lens group G1 that remains stationary with respect to the image plane Sim during zooming and has a positive refractive power; at least two movable lens groups that are moved by changing distances between the movable lens groups and adjacent groups in a direction of the optical axis during zooming; and a final lens group that remains stationary with respect to the image plane Sim during zooming and has a positive refractive power. In addition, in the present embodiment, the second lens group G2 and the third lens group G3 correspond to the movable lens groups, and the fourth lens group G4 corresponds to the final lens group.

In such a manner, by forming the first lens group G1 closest to the object side as a lens group having a positive refractive power, it is possible to shorten the total length of the lens system. Further, by making the first lens group G1 closest to the object side remain stationary during zooming, it is possible to prevent the total lens length from changing during zooming. Furthermore, by forming the final lens group closest to the image side as a lens group having a positive refractive power, it is possible to suppress an increase in incident angle of the principal ray of the off-axis rays incident onto the image plane Sim. Thus, it is possible to suppress shading.

The final lens group (in the present embodiment, the fourth lens group G4) consists of, in order from the object side, a front group Gf and a rear group Gr separated by an air distance from the front group Gf. The front group Gf has, successively in order from a position closest to the object side, two or less positive lenses and one first front group negative lens (a lens L43 in this embodiment), and a second front group negative lens (a lens L46 in this embodiment) that is different from the first front group negative lens at a position closest to an image side and is concave toward the image side. An aperture stop St is provided between the movable lens group and the first front group negative lens. The rear group Gr consists of a positive lens and a rear group negative meniscus lens (a lens L48 in this embodiment) that is convex toward the image side.

In such a manner, the positive lens is disposed at a position closest to the object side of the front group Gf, and thereby the effective diameter of the final lens group is prevented from becoming excessively large. The second front group negative lens is disposed at a position closest to the image side of the front group Gf, and thereby, it is possible to shorten the total length. By minimizing the number of positive lenses of the front group Gf arranged successively in order at the position closest to the object side to two or less, it is possible to prevent the thickness of the front group Gf on the optical axis from becoming excessively thick. By making the second front group negative lens concave toward the image side, it is possible to correct low-order spherical aberration while suppressing occurrence of higher-order spherical aberration. The positive lens of the rear group Gr has a function of correcting distortion and lateral chromatic aberration occurring in the second front group negative lens, and the rear group negative meniscus lens has a function of correcting field curvature while suppressing occurrence of astigmatism.

In the zoom lens according to the present embodiment, assuming that a distance on an optical axis from an image side surface of the first front group negative lens to an image side surface of the second front group negative lens is D1n and a distance on the optical axis from a surface closest to the object side to a surface closest to the image side in the front group Gf is D1, Conditional Expression (1) is satisfied. By not allowing the result of Conditional Expression (1) to be equal to or greater than the upper limit, it is possible to minimize the total length of the lens system. By not allowing the result of Conditional Expression (1) to be equal to or less than the lower limit, the first front group negative lens close to the aperture stop St and the second front group negative lens distant from the aperture stop St can be arranged to be separated from each other. Then, the principal ray passing through the second front group negative lens becomes higher than the principal ray passing through the first front group negative lens. Therefore, it is possible to correct longitudinal chromatic aberration mainly in the first front group negative lens, and correct longitudinal chromatic aberration and lateral chromatic aberration in the second front group negative lens. As a result, it becomes easy to change the balance between longitudinal chromatic aberration and lateral chromatic aberration. In addition, in a case where at least one of Conditional Expression (1-1) or (1-2) is satisfied, it is possible to obtain more favorable characteristics.

$$0.1 < D1n/D1 < 1 \tag{1}$$

$$0.3 < D1n/D1 < 0.8 \tag{1-1}$$

$$0.5 < D1n/D1 < 0.7 \tag{1-2}$$

In the zoom lens according to the present embodiment, it is preferable that assuming that a focal length of the second front group negative lens is fL1n2 and a focal length of the rear group negative meniscus lens is fL2n, Conditional Expression (2) is satisfied. By not allowing the result of Conditional Expression (2) to be equal to or greater than the upper limit, the refractive power of the rear group negative meniscus lens can be prevented from becoming excessively strong. Therefore, it is possible to suppress occurrence of distortion and lateral chromatic aberration. By not allowing the result of Conditional Expression (2) to be equal to or less than the lower limit, the refractive power of the second front group negative lens can be prevented from becoming excessively strong. Therefore, it is possible to suppress occurrence of astigmatism. Since it is possible to make the refractive power of the rear group negative meniscus lens further strong, it is possible to sufficiently correct field curvature. In addition, in a case where at least one of Conditional Expression (2-1) or (2-2) is satisfied, it is possible to obtain more favorable characteristics.

$$0.1 < fL1n2/fL2n < 1 \tag{2}$$

$$0.1 < fL1n2/fL2n < 0.5 \tag{2-1}$$

$$0.1 < fL1n2/fL2n < 0.3 \tag{2-2}$$

It is preferable that assuming that a focal length of the final lens group is fR and a focal length of the front group Gf is fR1, Conditional Expression (3) is satisfied. By not allowing the result of Conditional Expression (3) to be equal to or greater than the upper limit, the refractive power of the front group Gf can be prevented from becoming excessively strong. Therefore, it becomes easy to correct spherical aberration. By not allowing the result of Conditional Expression (3) to be equal to or less than the lower limit, the refractive power of the front group Gf can be prevented from becoming excessively weak. Therefore, it is possible to minimize the total length. In addition, in a case where Conditional Expression (3-1) is satisfied, it is possible to obtain more favorable characteristics.

$$0.1 < fR/fR1 < 2 \tag{3}$$

$$0.2 < fR/fR1 < 1.5 \tag{3-1}$$

It is preferable that assuming that a radius of curvature of an image side surface of the rear group negative meniscus lens is r2n2 and a radius of curvature of an object side surface of the rear group negative meniscus lens is r2n1, Conditional Expression (4) is satisfied. By not allowing the result of Conditional Expression (4) to be equal to or greater than the upper limit, it is possible to suppress occurrence of astigmatism. By not allowing the result of Conditional Expression (4) to be equal to or less than the lower limit, it is possible to suppress occurrence of high-order spherical aberration. In addition, in a case where at least one of Conditional Expression (4-1) or (4-2) is satisfied, it is possible to obtain more favorable characteristics.

$$0.1 < (r2n2 - r2n1)/(r2n2 + r2n1) < 1 \tag{4}$$

$$0.1 < (r2n2 - r2n1)/(r2n2 + r2n1) < 0.5 \tag{4-1}$$

$$0.1 < (r2n2 - r2n1)/(r2n2 + r2n1) < 0.4 \tag{4-2}$$

The rear group Gr may consist of, in order from the object side, a positive lens and the rear group negative meniscus lens. With such a configuration, there is an advantage in correcting field curvature.

Further, the rear group Gr may consist of, in order from the object side, the rear group negative meniscus lens and a positive lens. With such a configuration, there is an advantage in correcting distortion.

The front group Gf may consist of, in order from the object side, a positive lens, a positive lens, the first front group negative lens, a positive lens, a positive lens, and the second front group negative lens. With such a configuration, it is possible to minimize the total length while suppressing occurrence of spherical aberration.

Further, the front group Gf may consist of, in order from the object side, a positive lens, the first front group negative lens, a positive lens, a positive lens, and the second front group negative lens. With such a configuration, it is possible to suppress occurrence of spherical aberration while minimizing the thickness of the front group Gf on the optical axis.

Further, the at least two movable lens groups may consist of two movable lens groups. With such a configuration, it is possible to minimize the total length of the whole lens system.

With such a configuration, the at least two movable lens groups may consist of, in order from the object side, a second lens group G2 that has a negative refractive power and a third lens group G3 that has a positive refractive power. This configuration corresponds to Examples 1, 2, and 3 (FIGS. 1, 2, and 3) to be described later. In addition, the loci of movement of the movable lens groups are shown in only Example 1 (FIG. 1), and are omitted in different Examples 2 and 3 (FIGS. 2 and 3), and the loci of movement of the movable lens groups are the same in Examples 1, 2, and 3. In such a manner, by making the refractive power of the third lens group G3 positive, it is possible to lower the off-axis ray height. Therefore, it is possible to decrease the outer diameter of the first lens group G1, and this becomes a lens configuration in which there is an advantage in reducing the size and the weight thereof. Further, it is possible to minimize the angle of incidence into the fourth lens group G4, and thus it is possible to reduce spherical aberration in the entire zooming range.

Further, the at least two movable lens groups may consist of three movable lens groups. With such a configuration, it is possible to obtain favorable optical characteristics while minimizing the total length of the whole lens system.

With such a configuration, the at least two movable lens groups may consist of, in order from the object side, a second lens group G2 that has a positive refractive power, a third lens group G3 that has a negative refractive power, and a fourth lens group G4 that has a negative refractive power. This configuration corresponds to Example 4 (FIG. 4) to be described later. In such a manner, by making the refractive power of the second lens group G2 positive, it is possible to lower the off-axis ray height. Therefore, it is possible to decrease the outer diameter of the first lens group G1, and this becomes a lens configuration in which there is an advantage in reducing the size and the weight thereof. The movement range of the third lens group G3 and the movement range of the fourth lens group G4 can overlap with each other. Therefore, it is possible to shorten the total length.

In the example shown in FIG. 1, the optical member PP is disposed between the lens system and the image plane Sim. However, various filters such as a lowpass filter and a filter for cutting off a specific wavelength region may not be disposed between the lens system and the image plane Sim. Instead, such various filters may be disposed between the lenses, or coating for functions the same as those of various filters may be performed on a lens surface of any lens.

Next, numerical examples of the zoom lens of the present invention will be described.

First, a zoom lens of Example 1 will be described. FIG. 1 is a cross-sectional view illustrating a lens configuration of the zoom lens of Example 1. In FIG. 1 and FIGS. 2 to 4 corresponding to Examples 2 to 4 to be described later, aberrations in the wide-angle end state are shown in the upper part, on-axis rays wa and rays with the maximum angle of view wb are shown as rays. In addition, aberrations in the telephoto end state are shown in the lower part, and on-axis rays to and rays with the maximum angle of view tb are shown as rays. Further, loci of movement of the movable lens groups are indicated by arrows. Each drawing shows a state where the object at infinity is in focus, where the left side of the drawing is the object side and the right side of the drawing is the image side. It should be noted that the aperture stop St shown in the drawing does not necessarily indicate its size and shape, and indicates a position of the stop on the optical axis Z.

The zoom lens of Example 1 is composed of, in order from the object side, a first lens group G1 having a positive refractive power, a second lens group G2 having a negative refractive power, a third lens group G3 having a positive refractive power, and a fourth lens group G4 having a positive refractive power. In addition, in the present example, the second lens group G2 and the third lens group G3 correspond to the movable lens groups, and the fourth lens group G4 corresponds to the final lens group.

The first lens group G1 is composed of seven lenses L11 to L17. The second lens group G2 is composed of four lenses L21 to L24. The third lens group G3 is composed of three lenses L31 to L33. The fourth lens group G4 is composed of eight lenses L41 to L48.

The fourth lens group G4 (final lens group) is composed of a front group Gf consisting of six lenses L41 to L46 and a rear group Gr consisting of two lenses L47 and L48.

Table 1 shows basic lens data of the zoom lens of Example 1, Table 2 shows data about specification, and Table 3 shows data about variable surface distances. Hereinafter, meanings of the reference signs in the tables are, for example, as described in Example 1, and are basically the same as those in Examples 2 to 4.

In the lens data of Table 1, the column of the surface number shows surface numbers. The surface of the elements closest to the object side is the first surface, and the surface numbers sequentially increase toward the image plane side. The column of the radius of curvature shows radii of curvature of the respective surfaces. The column of the surface distance shows distances on the optical axis Z between the respective surfaces and the subsequent surfaces. Further, the column of n shows a refractive index of each optical element at the d line (a wavelength of 587.6 nm (nanometers)), and the column of vd shows an Abbe number of each optical element at the d line (a wavelength of 587.6 nm (nanometers)).

Here, the sign of the radius of curvature is positive in a case where a surface has a shape convex toward the object side, and is negative in a case where a surface has a shape convex toward the image plane side. In the basic lens data, the aperture stop St and the optical member PP are additionally noted. In a place of a surface number of a surface corresponding to the aperture stop St, the surface number and a term of (stop) are noted. Further, in the lens data of Table 1, in each place of the surface distance which is variable during zooming, DD[surface number] is noted. Numerical values each corresponding to the DD[surface number] are shown in Table 3.

In the data about the specification of Table 2, values of the zoom ratio, the focal length f, the back focal length Bf, the F number FNo., and the total angle of view 2ω are noted.

In the basic lens data, the data about specification, and the data about variable surface distances, a degree is used as a unit of an angle, and mm (millimeters) is used as a unit of a length, but appropriate different units may be used since the optical system can be used even in a case where the system is enlarged or reduced in proportion.

TABLE 1

Example 1-Lens Data (n and ν are based on d line)

| Surface Number | Radius of Curvature | Surface Distance | n | ν |
|---|---|---|---|---|
| 1 | 227.53208 | 2.000 | 1.48749 | 70.24 |
| 2 | 58.06068 | 1.100 | | |
| 3 | 54.24869 | 4.999 | 1.84667 | 23.79 |
| 4 | 89.11491 | 8.536 | | |
| 5 | −183.26740 | 2.000 | 1.85150 | 40.78 |
| 6 | 145.81689 | 2.172 | | |
| 7 | 167.91090 | 6.768 | 1.49700 | 81.54 |
| 8 | −99.07974 | 10.172 | | |
| 9 | 73.95686 | 2.200 | 1.84667 | 23.79 |
| 10 | 46.20207 | 9.433 | 1.43875 | 94.66 |
| 11 | ∞ | 0.200 | | |
| 12 | 63.89396 | 6.087 | 1.72916 | 54.68 |
| 13 | 399.48871 | DD [13] | | |
| 14 | −334.18732 | 1.201 | 1.90043 | 37.37 |
| 15 | 37.98668 | 4.440 | | |
| 16 | −34.45616 | 1.200 | 1.49700 | 81.54 |
| 17 | 59.68418 | 0.700 | | |
| 18 | 59.05649 | 4.820 | 1.84667 | 23.79 |
| 19 | −59.05649 | 1.200 | 1.85150 | 40.78 |
| 20 | 259.91618 | DD [20] | | |
| 21 | 383.97122 | 2.538 | 1.90366 | 31.31 |
| 22 | −102.36294 | 0.200 | | |
| 23 | 214.98722 | 4.862 | 1.60300 | 65.44 |
| 24 | −36.73949 | 1.200 | 1.71736 | 29.51 |
| 25 | −198.11620 | DD [25] | | |
| 26 (Stop) | ∞ | 2.172 | | |
| 27 | 42.08259 | 5.227 | 1.56883 | 56.04 |
| 28 | −421.05708 | 0.393 | | |
| 29 | 46.57231 | 7.179 | 1.43875 | 94.66 |
| 30 | −34.00142 | 1.201 | 1.85025 | 30.05 |
| 31 | 59.79695 | 7.569 | | |
| 32 | 146.12182 | 4.807 | 1.84667 | 23.79 |
| 33 | −42.10362 | 0.400 | | |
| 34 | 39.90271 | 4.318 | 1.60300 | 65.44 |
| 35 | −240.42306 | 1.200 | 1.95375 | 32.32 |
| 36 | 26.81888 | 6.525 | | |
| 37 | 36.79585 | 3.000 | 1.90366 | 31.31 |
| 38 | 67.98562 | 4.525 | | |
| 39 | −24.57063 | 1.200 | 1.51633 | 64.14 |
| 40 | −39.43088 | 5.000 | | |
| 41 | ∞ | 2.000 | 1.51633 | 64.14 |
| 42 | ∞ | 30.658 | | |

TABLE 2

Example 1-Specification (d Line)

| | Wide-Angle End | Telephoto End |
|---|---|---|
| Zoom Ratio | 1.0 | 2.6 |
| f | 51.501 | 134.933 |
| Bf | 36.976 | 36.976 |
| FNo. | 2.750 | 2.754 |
| 2ω [°] | 32.2 | 12.0 |

TABLE 3

Example 1-

| | Wide-Angle End | Telephoto End |
|---|---|---|
| DD [13] | 14.039 | 44.630 |
| DD [20] | 22.245 | 1.243 |
| DD [25] | 13.006 | 3.417 |

Figure 5:
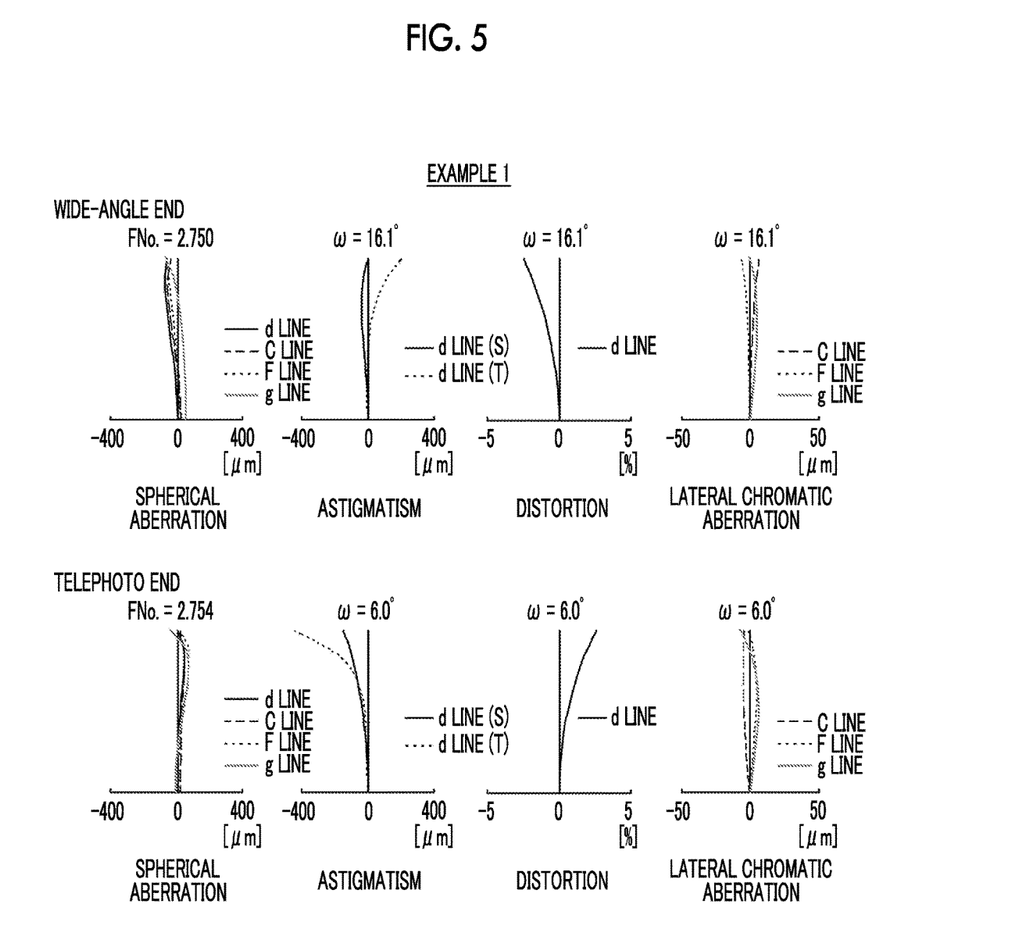
FIG. 5 is a diagram of aberrations of the zoom lens of Example 1 of the present invention.

FIG. 5 shows aberration diagrams of the zoom lens of Example 1. In addition, in order from the upper left side of FIG. 5, spherical aberration, astigmatism, distortion, and lateral chromatic aberration at the wide-angle end are shown. In order from the lower left side of FIG. 5, spherical aberration, astigmatism, distortion, and lateral chromatic aberration at the telephoto end are shown. Such aberration diagrams show aberrations in a state where the object distance is set as an infinite distance. The aberration diagrams illustrating spherical aberration, astigmatism, and distortion indicate aberrations that occur in a case where the d line (a wavelength of 587.6 nm (nanometers)) is set as a reference wavelength. In the spherical aberration diagram, aberrations at the d line (a wavelength of 587.6 nm (nanometers)), the C line (a wavelength of 656.3 nm (nanometers)), the F line (a wavelength of 486.1 nm (nanometers)), and the g line (a wavelength of 435.8 nm (nanometers)) are respectively indicated by the solid line, the long dashed line, the short dashed line, and the gray solid line. In the astigmatism diagram, aberrations in sagittal and tangential directions are respectively indicated by the solid line and the short dashed line. In the lateral chromatic aberration diagram, aberrations at the C line (a wavelength of 656.3 nm (nanometers)), the F line (a wavelength of 486.1 nm (nanometers)), and the g line (a wavelength of 435.8 nm (nanometers)) are respectively indicated by the long dashed line, the short dashed line, and the gray solid line. In addition, in the spherical aberration diagram, FNo. means an F number. In the other aberration diagrams, ω means a half angle of view.

Figure 2:
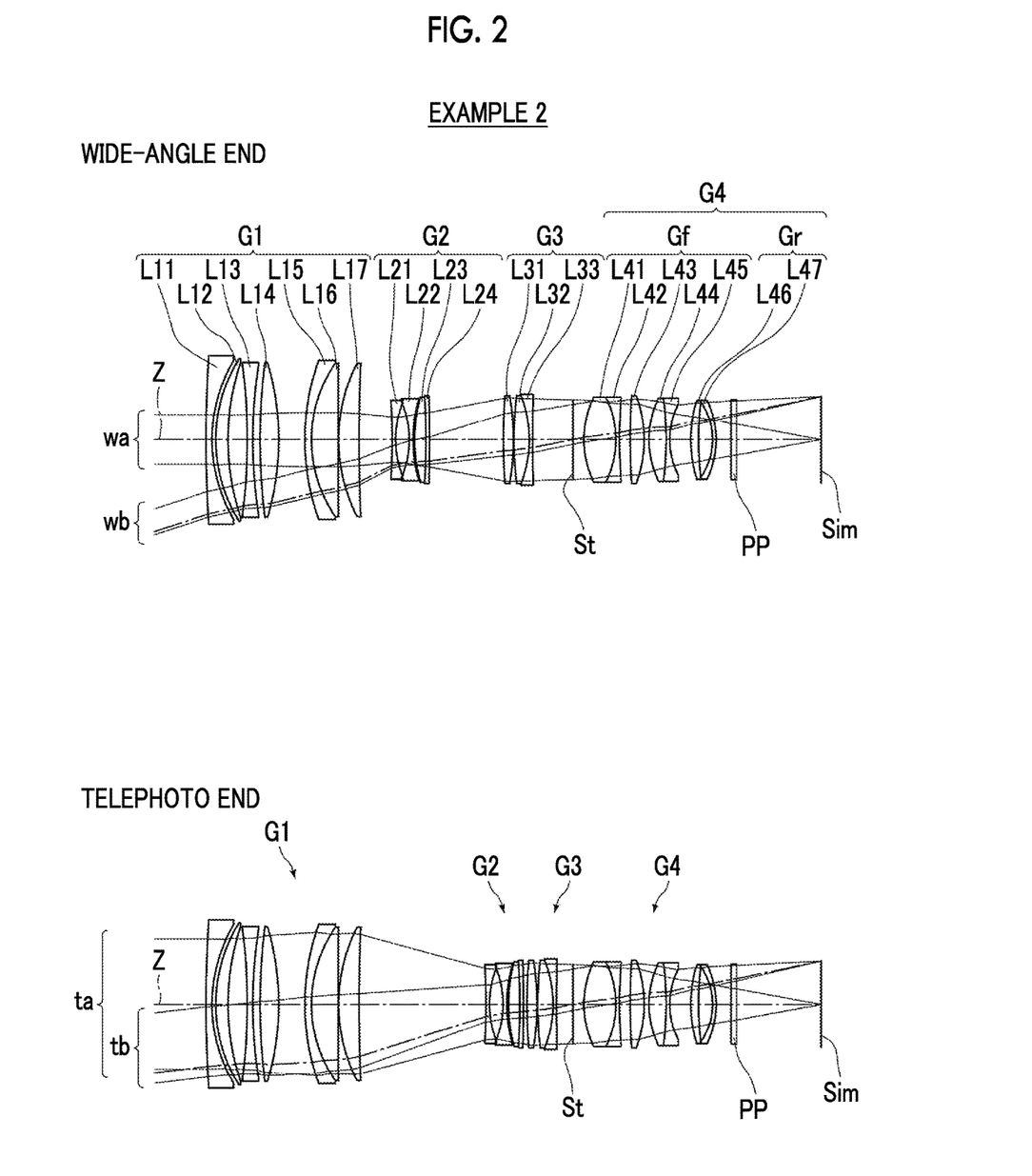
FIG. 2 is a cross-sectional view illustrating a lens configuration of a zoom lens of Example 2 of the present invention.
Figure 6:
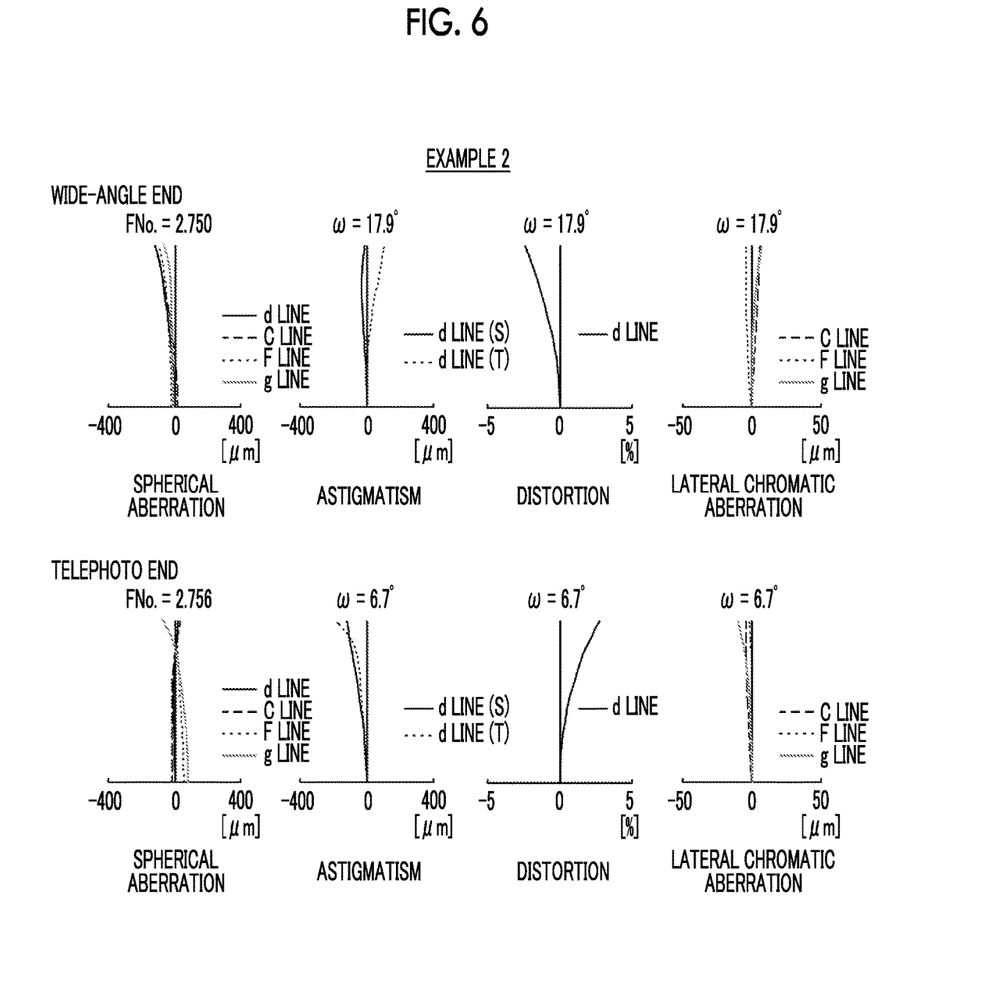
FIG. 6 is a diagram of aberrations of the zoom lens of Example 2 of the present invention.

Next, a zoom lens of Example 2 will be described. FIG. 2 is a cross-sectional view illustrating a lens configuration of the zoom lens of Example 2. Compared with the zoom lens of Example 1, the zoom lens of Example 2 is the same in terms of a configuration of the refractive power of each group and a configuration of the number of lenses of each group except that the fourth lens group G4 is composed of a front group Gf consisting of five lenses L41 to L45 and a rear group Gr consisting of two lenses L46 and L47. Further, Table 4 shows basic lens data of the zoom lens of Example 2, Table 5 shows data about specification, and Table 6 shows data about variable surface distances. FIG. 6 shows aberration diagrams thereof

TABLE 4

Example 2·Lens Data (n and ν are based on d line)

| Surface Number | Radius of Curvature | Surface Distance | n | ν |
|---|---|---|---|---|
| 1 | 444.09255 | 2.000 | 1.48749 | 70.24 |
| 2 | 52.74249 | 1.277 | | |
| 3 | 51.60553 | 4.074 | 1.84667 | 23.79 |
| 4 | 82.16037 | 6.492 | | |
| 5 | −192.52874 | 2.000 | 1.83481 | 42.72 |
| 6 | 164.76639 | 2.437 | | |
| 7 | 213.97971 | 6.245 | 1.49700 | 81.54 |
| 8 | −91.34810 | 8.821 | | |
| 9 | 79.05562 | 2.200 | 1.84667 | 23.79 |
| 10 | 45.42169 | 8.968 | 1.43875 | 94.66 |
| 11 | 3885.55273 | 0.121 | | |
| 12 | 56.53743 | 6.889 | 1.72916 | 54.68 |
| 13 | 623.26062 | DD [13] | | |
| 14 | −236.74725 | 1.201 | 1.91082 | 35.25 |
| 15 | 33.97322 | 4.547 | | |
| 16 | −32.31626 | 1.259 | 1.49700 | 81.54 |
| 17 | 49.03995 | 0.537 | | |
| 18 | 53.16990 | 3.803 | 1.89286 | 20.36 |
| 19 | −223.44243 | 1.210 | 1.85478 | 24.80 |
| 20 | −545.46043 | DD [20] | | |
| 21 | 188.34121 | 3.368 | 1.95375 | 32.32 |
| 22 | −87.65364 | 0.200 | | |
| 23 | 124.41235 | 5.152 | 1.59282 | 68.62 |
| 24 | −40.49428 | 1.200 | 1.78472 | 25.68 |
| 25 | 2078.18432 | DD [25] | | |
| 26 (Stop) | ∞ | 3.704 | | |
| 27 | 32.47074 | 10.709 | 1.43875 | 94.66 |
| 28 | −31.91695 | 1.201 | 1.73400 | 51.47 |
| 29 | 152.33524 | 3.659 | | |
| 30 | 229.76082 | 4.671 | 1.66680 | 33.05 |
| 31 | −42.20381 | 1.625 | | |
| 32 | 31.94310 | 5.743 | 1.60300 | 65.44 |
| 33 | −109.17735 | 1.200 | 1.91082 | 35.25 |
| 34 | 26.09253 | 7.246 | | |
| 35 | 45.09147 | 2.586 | 1.90366 | 31.31 |
| 36 | 111.38681 | 4.689 | | |
| 37 | −22.26014 | 1.201 | 1.48749 | 70.24 |
| 38 | −30.51955 | 5.000 | | |
| 39 | ∞ | 2.000 | 1.51633 | 64.14 |
| 40 | ∞ | 28.387 | | |

TABLE 5

Example 2·Specification (d Line)

| | Wide-Angle End | Telephoto End |
|---|---|---|
| Zoom Ratio | 1.0 | 2.6 |
| f | 46.018 | 120.568 |
| Bf | 34.706 | 34.706 |
| FNo. | 2.750 | 2.756 |
| 2ω [°] | 35.8 | 13.4 |

TABLE 6

Example 2·

| | Wide-Angle End | Telephoto End |
|---|---|---|
| DD [13] | 11.064 | 42.471 |
| DD [20] | 24.681 | 1.208 |
| DD [25] | 13.393 | 5.459 |

Figure 3:
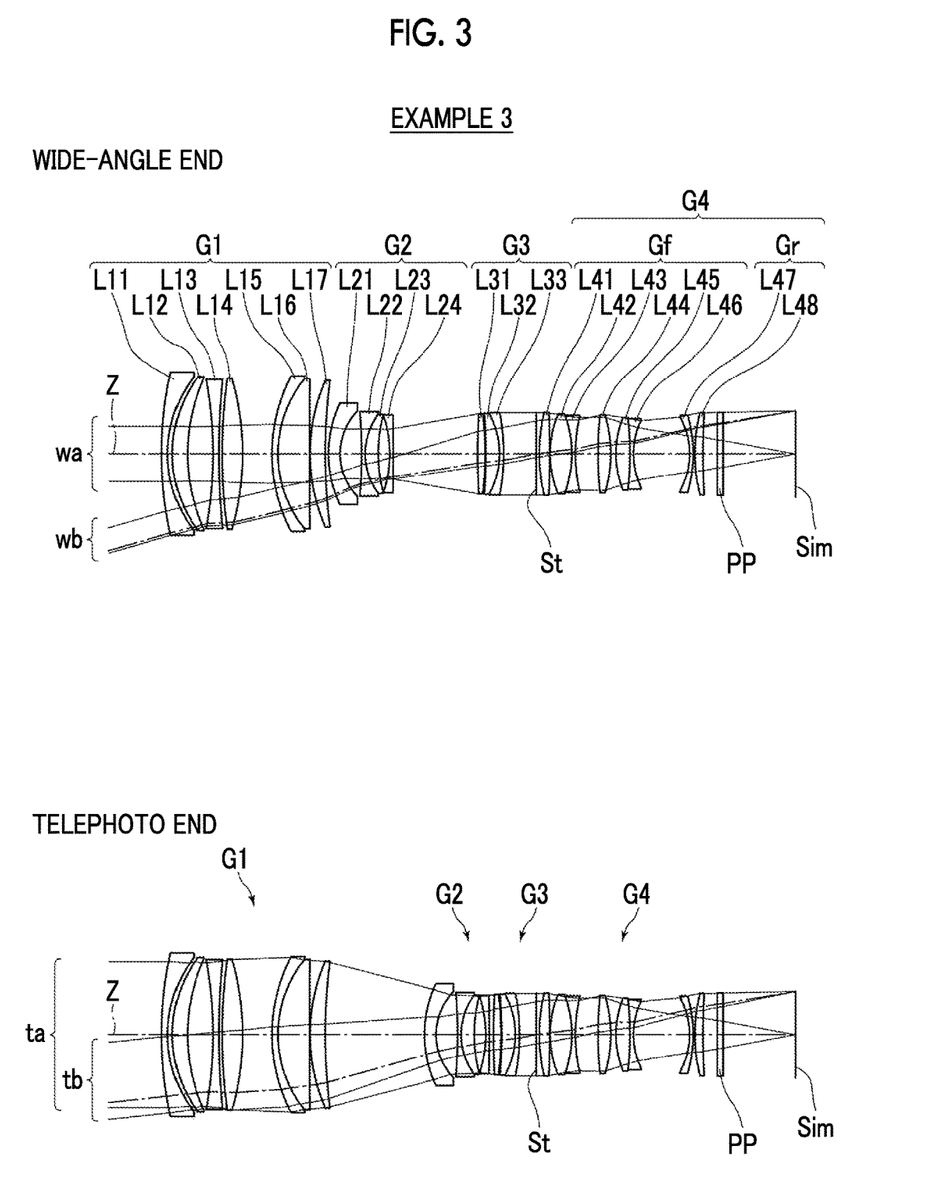
FIG. 3 is a cross-sectional view illustrating a lens configuration of a zoom lens of Example 3 of the present invention.
Figure 7:
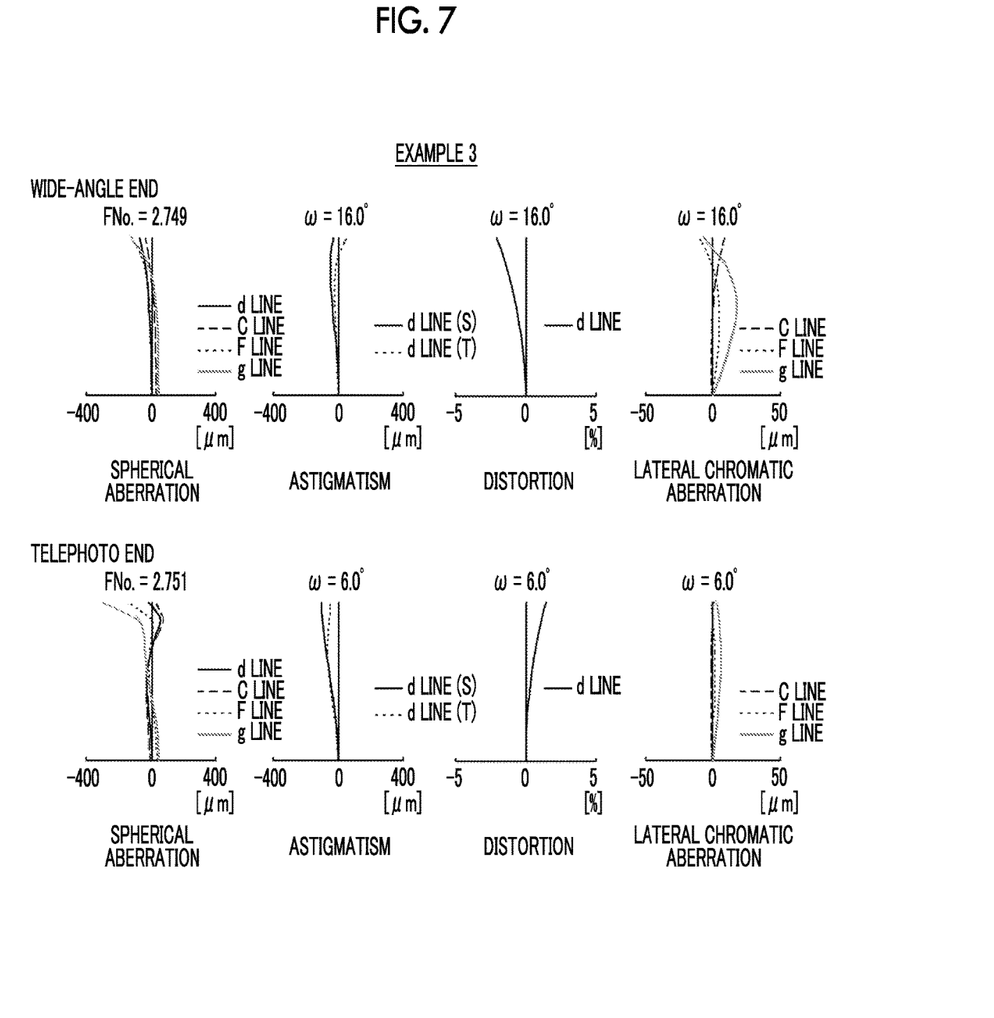
FIG. 7 is a diagram of aberrations of the zoom lens of Example 3 of the present invention.

Next, a zoom lens of Example 3 will be described. FIG. 3 is a cross-sectional view illustrating a lens configuration of the zoom lens of Example 3. Compared with Example 1, the zoom lens of Example 3 is the same in terms of a configuration of the refractive power of each group and a configuration of the number of lenses of each group. Further, Table 7 shows basic lens data of the zoom lens of Example 3, Table 8 shows data about specification, and Table 9 shows data about variable surface distances. FIG. 7 shows aberration diagrams thereof.

TABLE 7

Example 3·Lens Data (n and ν are based on d line)

| Surface Number | Radius of Curvature | Surface Distance | n | ν |
|---|---|---|---|---|
| 1 | 127.00423 | 2.000 | 1.48749 | 70.24 |
| 2 | 42.66604 | 1.598 | | |
| 3 | 43.69414 | 5.000 | 1.85896 | 22.73 |
| 4 | 60.69499 | 8.663 | | |
| 5 | −140.21011 | 2.000 | 1.80100 | 34.97 |
| 6 | 256.99090 | 1.081 | | |
| 7 | 187.17279 | 6.870 | 1.49700 | 81.54 |
| 8 | −91.67863 | 9.929 | | |
| 9 | 56.56356 | 2.000 | 1.84667 | 23.79 |
| 10 | 40.25739 | 10.649 | 1.43875 | 94.66 |
| 11 | 14734.22239 | 0.120 | | |
| 12 | 62.01141 | 5.105 | 1.60300 | 65.44 |
| 13 | 191.54358 | DD [13] | | |
| 14 | 40.26894 | 3.886 | 1.48749 | 70.24 |
| 15 | 20.70202 | 7.214 | | |
| 16 | −173.50486 | 1.210 | 1.49700 | 81.54 |
| 17 | 22.41667 | 4.377 | 1.85025 | 30.05 |
| 18 | 51.00575 | 3.859 | | |
| 19 | −41.17250 | 1.200 | 1.75500 | 52.32 |
| 20 | −785.22816 | DD [20] | | |
| 21 | 256.65707 | 2.525 | 1.83400 | 37.16 |
| 22 | −109.07337 | 0.200 | | |
| 23 | −168.05819 | 4.581 | 1.48749 | 70.24 |
| 24 | −28.32645 | 1.410 | 1.59270 | 35.31 |
| 25 | −72.20608 | DD [25] | | |
| 26 (Stop) | ∞ | 1.017 | | |
| 27 | 59.43515 | 3.508 | 1.56883 | 56.04 |
| 28 | −317.75521 | 0.120 | | |
| 29 | 35.05890 | 7.299 | 1.43875 | 94.66 |
| 30 | −37.96163 | 1.200 | 1.85025 | 30.05 |
| 31 | 55.43706 | 7.623 | | |
| 32 | 119.41579 | 4.297 | 1.84667 | 23.79 |
| 33 | −45.52911 | 1.752 | | |
| 34 | 32.86120 | 4.683 | 1.62230 | 53.17 |
| 35 | −116.67145 | 1.200 | 1.95375 | 32.32 |
| 36 | 26.07586 | 18.796 | | |
| 37 | −25.76438 | 1.200 | 1.48749 | 70.24 |
| 38 | −46.44353 | 0.563 | | |
| 39 | 55.84867 | 2.706 | 1.95375 | 32.32 |
| 40 | 205.12590 | 5.000 | | |
| 41 | ∞ | 2.000 | 1.51633 | 64.14 |
| 42 | ∞ | 24.408 | | |

TABLE 8

Example 3·Specification (d Line)

| | Wide-Angle End | Telephoto End |
|---|---|---|
| Zoom Ratio | 1.0 | 2.6 |
| f | 51.488 | 134.899 |
| Bf | 30.726 | 30.726 |
| FNo. | 2.749 | 2.751 |
| 2ω [°] | 32.0 | 12.0 |

TABLE 9

Example 3·

| | Wide-Angle End | Telephoto End |
|---|---|---|
| DD [13] | 1.094 | 33.547 |
| DD [20] | 28.570 | 1.424 |
| DD [25] | 10.937 | 5.629 |

Figure 4:
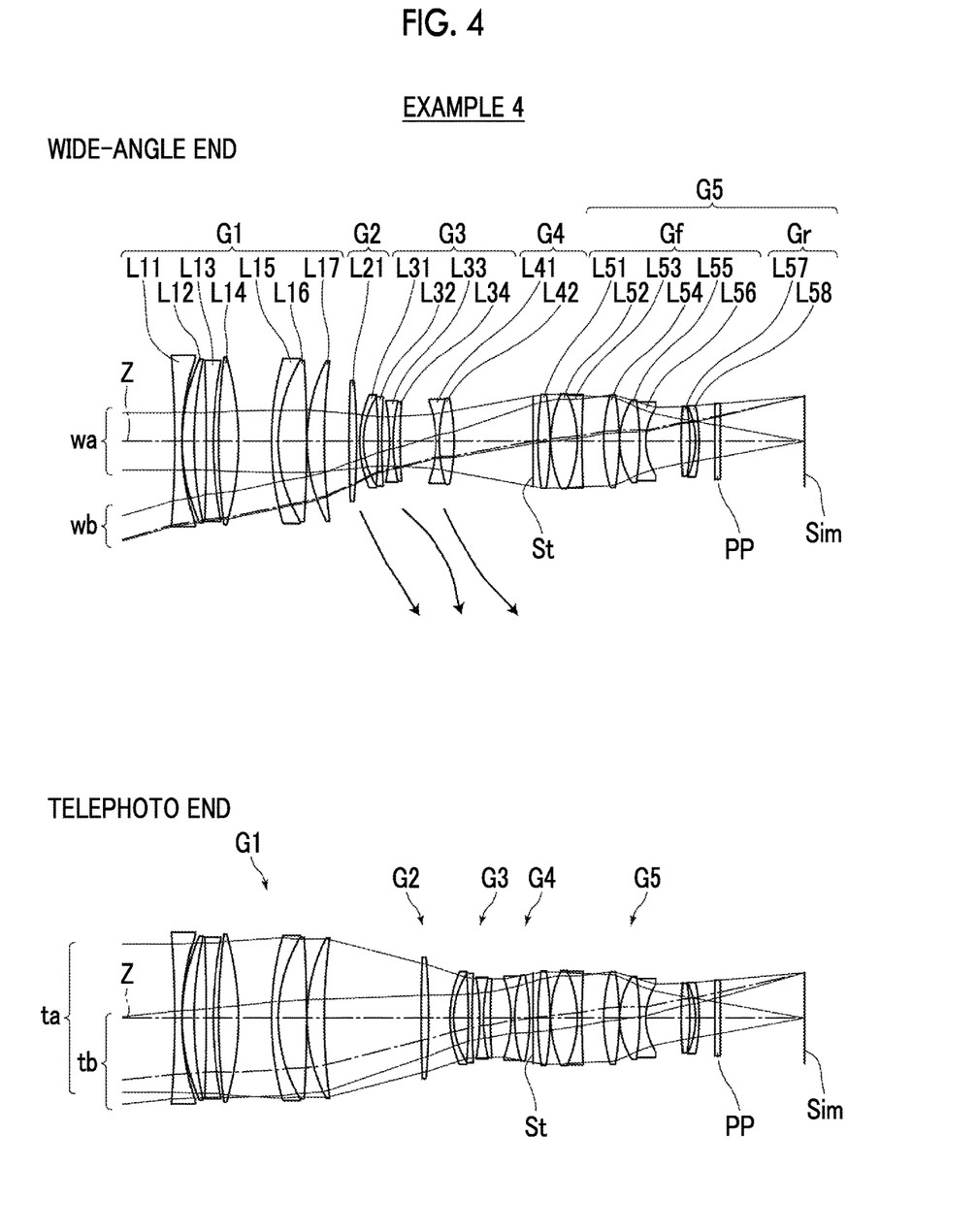
FIG. 4 is a cross-sectional view illustrating a lens configuration of a zoom lens of Example 4 of the present invention.

Next, a zoom lens of Example 4 will be described. FIG. 4 is a cross-sectional view illustrating a lens configuration of the zoom lens of Example 4.

The zoom lens of Example 4 is composed of, in order from the object side, a first lens group G1 having a positive refractive power, a second lens group G2 having a positive refractive power, a third lens group G3 having a negative refractive power, a fourth lens group G4 having a negative refractive power, and a fifth lens group G5 having a positive refractive power. In addition, in the present example, the second lens group G2, the third lens group G3, and the fourth lens group G4 correspond to the movable lens groups, and the fifth lens group G5 corresponds to the final lens group.

The first lens group G1 is composed of seven lenses L11 to L17. The second lens group G2 is composed of only one lens L21. The third lens group G3 is composed of four lenses L31 to L34. The fourth lens group G4 is composed of two lenses L41 and L42. The fifth lens group G5 is composed of eight lenses L51 to L58.

The fifth lens group G5 (final lens group) is composed of a front group Gf consisting of six lenses L51 to L56 and a rear group Gr consisting of two lenses L57 and L58.

Figure 8:
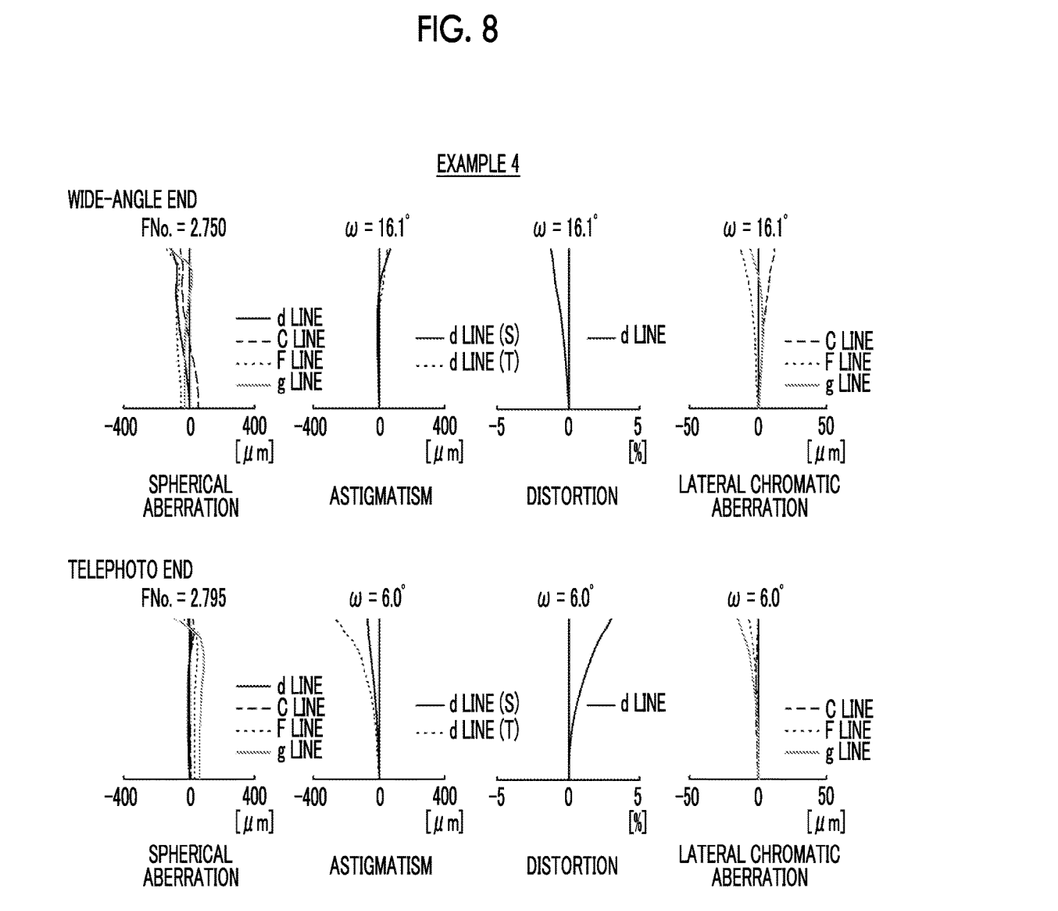
FIG. 8 is a diagram of aberrations of the zoom lens of Example 4 of the present invention.

Further, Table 10 shows basic lens data of the zoom lens of Example 4, Table 11 shows data about specification, and Table 12 shows data about variable surface distances. FIG. 8 shows aberration diagrams thereof.

TABLE 10

Example 4·Lens Data (n and ν are based on d line)

| Surface Number | Radius of Curvature | Surface Distance | n | ν |
|---|---|---|---|---|
| 1 | −351.60418 | 2.300 | 1.48749 | 70.24 |
| 2 | 87.03799 | 0.120 | | |
| 3 | 67.61306 | 3.582 | 1.85896 | 22.73 |
| 4 | 119.92087 | 3.925 | | |
| 5 | −676.63823 | 2.300 | 1.91082 | 35.25 |
| 6 | 128.88468 | 1.820 | | |
| 7 | 208.42536 | 6.366 | 1.43875 | 94.66 |
| 8 | −96.09062 | 10.616 | | |
| 9 | 95.17770 | 2.200 | 1.80518 | 25.42 |
| 10 | 51.01858 | 9.136 | 1.43875 | 94.66 |
| 11 | −409.46788 | 0.120 | | |
| 12 | 56.51940 | 5.507 | 1.77250 | 49.60 |
| 13 | 189.31203 | DD [13] | | |
| 14 | 409.55538 | 2.424 | 1.43875 | 94.66 |
| 15 | −229.77588 | DD[15] | | |
| 16 | 37.50405 | 1.200 | 1.49700 | 81.54 |
| 17 | 26.09863 | 4.698 | | |
| 18 | −179.58155 | 1.200 | 1.84763 | 43.24 |
| 19 | 222.69320 | 2.449 | | |
| 20 | −72.50144 | 1.210 | 1.59522 | 67.73 |
| 21 | 56.79431 | 2.194 | 1.84666 | 23.78 |
| 22 | 159.83989 | DD [22] | | |
| 23 | −36.19722 | 1.200 | 1.90043 | 37.37 |
| 24 | 47.96737 | 4.749 | 1.80518 | 25.43 |
| 25 | −64.37202 | DD [25] | | |
| 26 (Stop) | ∞ | 1.550 | | |
| 27 | 102.59444 | 3.913 | 1.56883 | 56.04 |
| 28 | −93.22223 | 0.200 | | |
| 29 | 36.43889 | 8.532 | 1.49700 | 81.54 |

TABLE 10-continued

Example 4·Lens Data (n and ν are based on d line)

| Surface Number | Radius of Curvature | Surface Distance | n | ν |
|---|---|---|---|---|
| 30 | −36.57060 | 1.500 | 1.80518 | 25.42 |
| 31 | 280.95233 | 7.050 | | |
| 32 | 53.20417 | 4.981 | 1.84667 | 23.79 |
| 33 | −89.76146 | 0.120 | | |
| 34 | 24.27137 | 6.406 | 1.60311 | 60.64 |
| 35 | −84.42265 | 2.000 | 1.95375 | 32.32 |
| 36 | 19.55041 | 11.494 | | |
| 37 | 179.55567 | 2.586 | 1.62004 | 36.26 |
| 38 | −68.02772 | 1.769 | | |
| 39 | −26.81778 | 1.201 | 1.78800 | 47.37 |
| 40 | −56.73936 | 5.000 | | |
| 41 | ∞ | 2.000 | 1.51633 | 64.14 |
| 42 | ∞ | 27.093 | | |

TABLE 11

Example 4·Specification (d Line)

| | Wide-Angle End | Telephoto End |
|---|---|---|
| Zoom Ratio | 1.0 | 2.6 |
| f' | 50.732 | 132.917 |
| Bf' | 33.411 | 33.411 |
| FNo. | 2.750 | 2.795 |
| 2ω [°] | 32.2 | 12.0 |

TABLE 12

Example 4·

| | Wide-Angle End | Telephoto End |
|---|---|---|
| DD [13] | 7.955 | 31.053 |
| DD [15] | 1.001 | 7.082 |
| DDr22] | 11.594 | 6.625 |
| DD [25] | 25.324 | 1.114 |

Table 13 shows values corresponding to Conditional Expressions (1) to (4) of the zoom lenses of Examples 1 to 4. It should be noted that, in the above-mentioned examples, the d line is set as the reference wavelength, and the values shown in Table 13 are values at the reference wavelength.

TABLE 13

| Expression Number | Conditional Expression | Example 1 | Example 2 | Example 3 | Example 4 |
|---|---|---|---|---|---|
| (1) | D1n/D1 | 0.566 | 0.587 | 0.617 | 0.592 |
| (2) | fL1n2/fL2n | 0.194 | 0.130 | 0.184 | 0.251 |
| (3) | fR/fR1 | 0.740 | 0.578 | 0.869 | 0.980 |
| (4) | (r2n2 − r2n1)/(r2n2 + r2n1) | 0.232 | 0.156 | 0.286 | 0.358 |

As can be seen from the above-mentioned data, all the zoom lenses of Examples 1 to 4 satisfy Conditional Expressions (1) to (4), and are zoom lenses for which reduction in size and weight is achieved and high optical performance is achieved.

Figure 9:
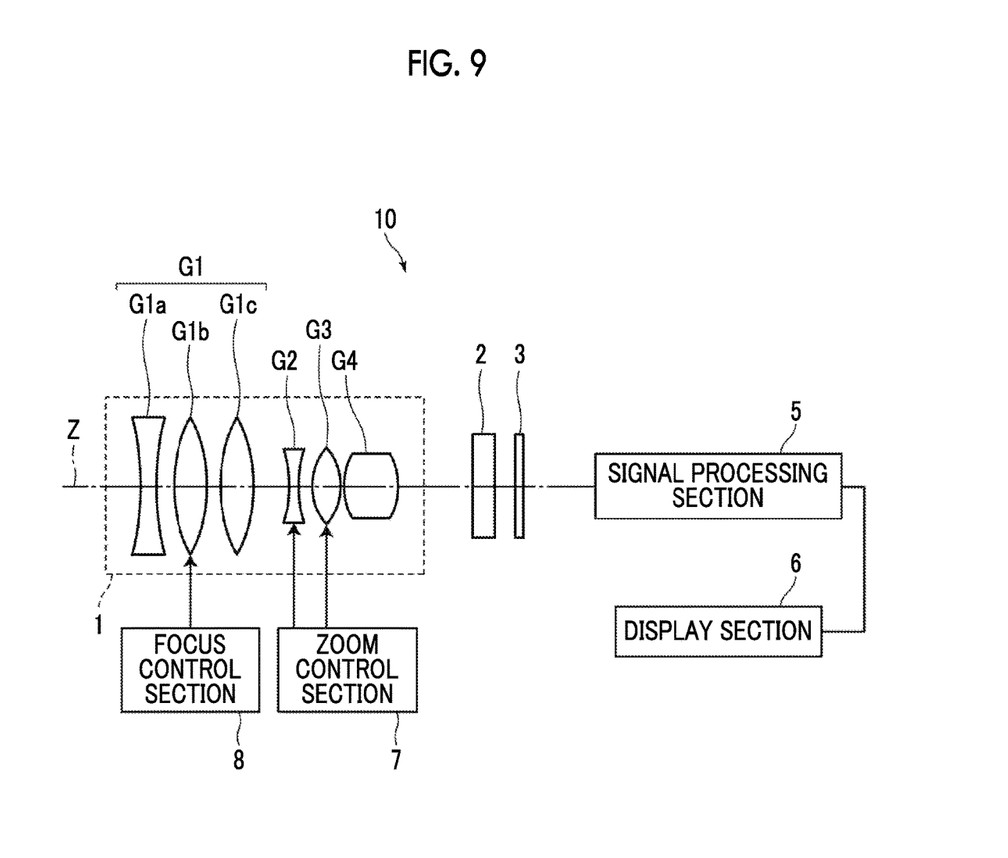
FIG. 9 is a schematic configuration diagram of an imaging apparatus according to an embodiment of the present invention.

Next, an imaging apparatus according to an embodiment of the present invention will be described. FIG. 9 is a schematic configuration diagram of an imaging apparatus 10 using the zoom lens 1 according to the above-mentioned embodiment of the present invention as an example of an imaging apparatus of an embodiment of the present invention. Examples of the imaging apparatus 10 include a movie imaging camera, a broadcast camera, a digital camera, a video camera, a surveillance camera, and the like.

The imaging apparatus 10 comprises a zoom lens 1, a filter 2 which is disposed on the image side of the zoom lens 1, and an imaging element 3 which is disposed on the image side of the filter 2. FIG. 9 schematically shows the first to fourth lens groups G1 to G4 comprising the zoom lens 1. Further, the following is schematically shown: the first lens group G1 is divided into three sub-lens groups of a first-a lens group G1a, a first-b lens group G1b, and a first-c lens group G1c.

The imaging element 3 captures an image of a subject, which is formed through the zoom lens 1, and converts the image into an electrical signal. For example, charge coupled device (CCD), complementary metal oxide semiconductor (CMOS), or the like may be used. The imaging element 3 is disposed such that the imaging surface thereof is coplanar with the image plane of the zoom lens 1.

The imaging apparatus 10 also comprises a signal processing section 5 which performs calculation processing on an output signal from the imaging element 3, a display section 6 which displays an image formed by the signal processing section 5, a zoom control section 7 which controls zooming of the zoom lens 1, and a focus control section 8 which controls focusing of the zoom lens 1. It should be noted that FIG. 9 shows only one imaging element 3, but the imaging apparatus of the present invention is not limited to this, and may be a so-called three-plate imaging apparatus having three imaging elements.

The present invention has been hitherto described through embodiments and examples, but the present invention is not limited to the above-mentioned embodiments and examples, and may be modified into various forms. For example, values such as the radius of curvature, the surface distance, the refractive index, and the Abbe number of each lens are not limited to the values shown in the numerical examples, and different values may be used therefor.

EXPLANATION OF REFERENCES

1: zoom lens
2: filter
3: imaging element
5: signal processing section
6: display section
7: zoom control section
8: focus control section
10: imaging apparatus
G1: first lens group
G1a: first-a lens group
G1b: first-b lens group
G1c: first-c lens group
G2: second lens group
G3: third lens group
G4: fourth lens group
G5: fifth lens group
Gf: front group
Gr: rear group
L11 to L58: lens
PP: optical member
Sim: image plane
St: aperture stop
ta, wa: halogen
tb, wb: rays with maximum angle of view
Z: optical axis

What is claimed is:

1. A zoom lens consisting of, in order from an object side:
a first lens group that remains stationary with respect to an image plane during zooming and has a positive refractive power;
two or three movable lens groups that are moved by changing distances between the movable lens groups and adjacent groups in a direction of an optical axis during zooming; and
a final lens group that remains stationary with respect to the image plane during zooming and has a positive refractive power,
wherein the final lens group consists of, in order from the object side, a front group and a rear group separated by an air distance from the front group,
wherein the front group has, successively in order from a position closest to the object side, two or less positive lenses and one first front group negative lens, and a second front group negative lens that is different from the first front group negative lens at a position closest to an image side and is concave toward the image side,
wherein a stop is provided between the movable lens group adjacent to the final lens group and the first front group negative lens,
wherein the rear group consists of a positive lens and a rear group negative meniscus lens that is convex toward the image side,
wherein assuming that a distance on an optical axis from an image side surface of the first front group negative lens to an image side surface of the second front group negative lens is D1n and a distance on the optical axis from a surface closest to the object side to a surface closest to the image side in the front group is D1, Conditional Expression (1) is satisfied, $$0.1 < D1n/D1 < 1 \qquad (1), \text{and}$$

wherein assuming that a focal length of the final lens group is fR and a focal length of the front group is fR1, Conditional Expression (3) is satisfied, $$0.1 < fR/fR1 < 2 \qquad (3).$$

2. The zoom lens according to claim 1,
wherein the rear group consists of, in order from the object side, the positive lens and the rear group negative meniscus lens.

3. The zoom lens according to claim 1,
wherein the rear group consists of, in order from the object side, the rear group negative meniscus lens and the positive lens.

4. The zoom lens according to claim 1,
wherein the front group consists of, in order from the object side, a positive lens, a positive lens, the first front group negative lens, a positive lens, a positive lens, and the second front group negative lens.

5. The zoom lens according to claim 1,
wherein the front group consists of, in order from the object side, a positive lens, the first front group negative lens, a positive lens, a positive lens, and the second front group negative lens.

6. The zoom lens according to claim 1,
wherein Conditional Expression (1-1) is satisfied, $$0.3 < D1n/D1 < 0.8 \qquad (1-1).$$

7. The zoom lens according to claim 1,
wherein Conditional Expression (1-2) is satisfied, $$0.5 < D1n/D1 < 0.7 \qquad (1-2).$$

8. The zoom lens according to claim 1, wherein Conditional Expression (3-1) is satisfied, $$0.2 < fR/fR1 < 1.5 \quad (3\text{-}1).$$

9. An imaging apparatus comprising the zoom lens according to claim 1.

10. The zoom lens according to claim 1,
wherein assuming that a focal length of the second front group negative lens is fL1n2 and a focal length of the rear group negative meniscus lens is fL2n, Conditional Expression (2) is satisfied, $$0.1 < fL1n2/fL2n < 1 \quad (4).$$

11. The zoom lens according to claim 10,
wherein Conditional Expression (2-1) is satisfied, $$0.1 < fL1n2/fL2n < 0.5 \quad (2\text{-}1).$$

12. The zoom lens according to claim 10,
wherein Conditional Expression (2-2) is satisfied, $$0.1 < fL1n2/fL2n < 0.3 \quad (2\text{-}2).$$

13. The zoom lens according to claim 1,
wherein assuming that a radius of curvature of an image side surface of the rear group negative meniscus lens is r2n2 and a radius of curvature of an object side surface of the rear group negative meniscus lens is r2n1, Conditional Expression (4) is satisfied, $$0.1 < (r2n2 - r2n1)/(r2n2 + r2n1) < 1 \quad (4).$$

14. The zoom lens according to claim 13,
wherein Conditional Expression (4-1) is satisfied, $$0.1 < (r2n2 - r2n1)/(r2n2 + r2n1) < 0.5 \quad (4\text{-}1).$$

15. The zoom lens according to claim 13,
wherein Conditional Expression (4-2) is satisfied, $$0.1 < (r2n2 - r2n1)/(r2n2 + r2n1) < 0.4 \quad (4\text{-}2).$$

16. The zoom lens according to claim 1,
wherein the at least two movable lens groups consist of two movable lens groups.

17. The zoom lens according to claim 16,
wherein the at least two movable lens groups consist of, in order from the object side, a second lens group that has a negative refractive power and a third lens group that has a positive refractive power.

18. The zoom lens according to claim 1,
wherein the at least two movable lens groups consist of three movable lens groups.

19. The zoom lens according to claim 18,
wherein the at least two movable lens groups consist of, in order from the object side, a second lens group that has a positive refractive power, a third lens group that has a negative refractive power, and a fourth lens group that has a negative refractive power.

* * * * *